(12) United States Patent
Frenkel et al.

(10) Patent No.: US 9,346,939 B2
(45) Date of Patent: May 24, 2016

(54) FLEXIBLE PVC COMPOUNDS HAVING A LOW METALS CONTENT

(71) Applicant: Galata Chemicals LLC, Southbury, CT (US)

(72) Inventors: Peter Frenkel, Danbury, CT (US); Anthony Joseph DeMaio, Woodbury, CT (US); Steven McKeown, Southbury, CT (US)

(73) Assignee: Galata Chemicals LLC, Southbury, CT (US)

( * ) Notice: Subject to any disclaimer, the term of this patent is extended or adjusted under 35 U.S.C. 154(b) by 0 days.

(21) Appl. No.: 14/463,372

(22) Filed: Aug. 19, 2014

(65) Prior Publication Data

US 2015/0126651 A1 May 7, 2015

Related U.S. Application Data

(60) Provisional application No. 61/899,024, filed on Nov. 1, 2013.

(51) Int. Cl.
| | |
|---|---|
| *C08K 5/1515* | (2006.01) |
| *C08K 5/098* | (2006.01) |
| *C09K 15/00* | (2006.01) |
| *C09K 15/34* | (2006.01) |

(52) U.S. Cl.
CPC ............... *C08K 5/1515* (2013.01); *C08K 5/098* (2013.01); *C09K 15/34* (2013.01)

(58) Field of Classification Search
CPC ...... C08K 5/1515; C08K 5/098; C09K 15/00; C09K 15/34
See application file for complete search history.

(56) References Cited

U.S. PATENT DOCUMENTS

| | | | |
|---|---|---|---|
| 2,669,548 | A | 2/1954 | Darby et al. |
| 2,711,401 | A | 6/1955 | Lally |
| 2,895,966 | A | 7/1959 | Ault et al. |
| 3,003,998 | A | 10/1961 | Kauder et al. |
| 3,003,999 | A | 10/1961 | Kauder et al. |
| 3,004,000 | A | 10/1961 | Kauder et al. |
| 3,049,504 | A | 8/1962 | Swern et al. |
| 4,123,399 | A | 10/1978 | Gay |
| 4,123,400 | A | 10/1978 | Gay |
| 4,421,687 | A | 12/1983 | Hasegawa et al. |
| 5,451,628 | A | 9/1995 | Baker |
| 6,797,753 | B2 | 9/2004 | Benecke et al. |
| 7,071,343 | B2 | 7/2006 | Daute et al. |
| 8,383,708 | B2 | 2/2013 | Geng et al. |
| 2010/0010126 | A1 | 1/2010 | Ruschel et al. |
| 2010/0010127 | A1 | 1/2010 | Barki et al. |

FOREIGN PATENT DOCUMENTS

| | | | |
|---|---|---|---|
| WO | 2011143028 | 11/2011 | |
| WO | WO 2011/143028 A1 * | 11/2011 | ............ C08L 27/06 |
| WO | 2013055961 | 4/2013 | |

OTHER PUBLICATIONS

Handbook of Polyvinyl chloride formulating; edited by Edward J. Wickson; John Wiley & Sons, 1993, p. 322-325.

* cited by examiner

*Primary Examiner* — Robert Harlan
(74) *Attorney, Agent, or Firm* — Dilworth IP LLC

(57) ABSTRACT

A flexible compound comprising PVC or its co-polymers; greater than 10 to 200 parts by weight of at least one bio-based primary plasticizer comprising epoxidized fatty acid esters, wherein the fatty acids are derived from natural oils and animal fats, based on 100 parts by weight of PVC or its co-polymers; and 0.001 to 10 parts by weight of a mixed metal stabilizer comprising a zinc compound and at least one metal compound where the metal is selected from Li, Na, K, Mg, Ca, Sr, Ba, Cd, Al, La, Ce or rare earth metals, based on 100 parts by weight of PVC or its co-polymers, wherein an atomic ratio of metal/Zn for the mixed metal stabilizer is less than 1.0.

42 Claims, No Drawings

FLEXIBLE PVC COMPOUNDS HAVING A LOW METALS CONTENT

FIELD OF THE INVENTION

The present invention relates to mixed metal stabilizers and flexible compounds containing polyvinyl chloride plasticized with bio-based epoxy-type plasticizers, and stabilized with mixed metal stabilizers.

BACKGROUND OF THE INVENTION

Polyvinyl chloride is one of the most widely used plastics in the world, and is present in such applications as pipes and pipe fittings, film and sheet, flooring, cables and construction profiles. However, polyvinyl chloride can decompose during processing, upon heating or on prolonged exposure to sunlight due to loss of HCl from the polymer, resulting in discoloration and embrittlement. Stabilizers are used to prevent or reduce degradation and discoloration of polyvinyl chloride due to its exposure to heat, UV-light and in-process stress and shear that cause dehydrochlorination, auto-oxidation and mechano-chemical chain scission of the polymer and its co-polymers. These stabilizers help to prevent degradation not only during processing of the polyvinyl chloride compound, but also during the useful life of finished goods and articles made from it. Driven by the importance of stabilizer performance in compounds containing polyvinyl chloride, work has been ongoing to produce improved stabilizers for such use.

U.S. Pat. No. 2,669,548 relates to stabilizers containing zinc salts of organic or inorganic acids, calcium ethyl acetoacetate and 1,3-dicarbonylic compound, such as beta-diketones.

U.S. Pat. No. 2,711,401 relates to stabilizers containing admixtures of metal carboxylates of aliphatic and cycloaliphatic acids, where the metal is Mg, Ca, Sr, Ba, Zn or Cd, among others, with aliphatic polyhydric alcohols, esters of aliphatic polyhydric alcohols or ethers of aliphatic polyhydric alcohols.

U.S. Pat. No. 3,003,998 relates to stabilizer compositions consisting of calcium benzoate, zinc salts of fatty acids and glycerol.

U.S. Pat. No. 3,003,999 describes stabilizer compositions consisting of calcium salts of fatty acids, zinc salts of fatty acids and sorbitol.

U.S. Pat. No. 3,004,000 relates to stabilizer compositions consisting of calcium and zinc salts and sorbitol, where at least one of the salts is benzoate and at least of the salts is derived from fatty acids.

U.S. Pat. Nos. 4,123,399 and 4,123,400 relate to rigid and plasticized PVC homo- or co-polymer compounds stabilized with a mixed metal stabilizer, a polyol (such as sorbitol) and a beta-diketone (such as dibenzoylmethane and stearoylbenzoylmethane). The mixed metal stabilizer comprises aromatic and aliphatic carboxylates of calcium, zinc, barium and cadmium, including salts of fatty acids.

U.S. Pat. No. 4,421,687 relates to a PVC stabilizer comprising at least one basic inorganic compound of lithium, sodium, potassium, magnesium, calcium, strontium, or barium, among other metals and a 1,3-deketone.

U.S. Pat. No. 5,451,628 relates to a stabilizer consisting of a mixed zinc/alkaline-earth metal carboxylate, a hydrotalcite and antimony trioxide, where the mixed metal carboxylate is selected from the group consisting of barium/zinc carboxylate and calcium/zinc salts of fatty acids.

Plasticizers are used primarily in flexible and semi-rigid polyvinyl chloride compounds to improve their processability, flexibility, durability and stretchability, decrease melt viscosity, glass transition temperature, and modulus of elasticity. Bio-based plasticizers additionally may result in a positive environmental impact including reduced carbon footprint and reduced energy consumption.

In view of the need for flexible polyvinyl chloride compounds that are environmentally friendly, work has also been ongoing to develop bio-based plasticizers derived from fatty acids and containing epoxy functional groups.

U.S. Pat. No. 2,895,966 relates to the preparation of predominantly epoxidized monoglyceride diacetates by transesterifying vegetable oils with triacetin (glycerol triacetate).

U.S. Pat. No. 3,049,504 relates to a process for the preparation of an epoxidized monoglyceride diacetate-type plasticizer, where animal fat is used as a raw material.

U.S. Pat. No. 6,797,753 relates to compositions and methods for plasticizing polyvinyl chloride polymers where the plasticizers contain fatty acids derived from vegetable oils and the fatty acids are substantially fully esterified with an alcohol (mono-ol or polyol), the fatty acids having unsaturated bonds that are substantially fully epoxidized, and wherein the fatty acids are added substantially randomly to one or more hydroxyl sites on the alcohol. The plasticizers may be added in amounts between about 10 to 230 phr of PVC resin.

U.S. Pat. No. 8,383,708 relates to unhindered polyols used to react with an epoxidized soyate to make epoxidized soyate diester in the presence of a catalyst. The unhindered polyol can be 1,3-propanediol or any polyol having four or more carbon atoms with no two adjacent carbon atoms having hydroxyl functionality. A combination of catalysts is used to promote the transesterification reaction of the epoxidized soyate with the unhindered polyol to yield a high percentage of epoxidized soyate diester with epoxy functionality retained. The primary catalyst is a metallic hydroxide, and the secondary catalyst is a titanate. Bioderived epoxidized soyate diester plasticizers useful for thermoplastics and thermosets result.

U.S. Patent Application No. 2010/0010126 relates to the use of an inter-esterification reaction between vegetable or animal oils as monoacid esters (preferentially with 1 to 12 carbons) and monoalcohol esters (preferentially with 1 to 12 carbons). The use of ethyl acetate is preferred as it is a product that may be obtained from ethanol (renewable) and has a boiling point (77 deg. C.), which facilitates separation by vacuum distillation at the end of the reaction and its reuse. By varying the molar ratio between glycerol triester (oil or fat) and monoalcohol ester, different proportions of glycerol esters are obtained with 1 or 2 linked fatty acids and 1 or 2 linked acids of short chain, along with the formation of fatty acid ester and monoalcohol ester. After the distillation of excess residual ethyl acetate, products are obtained with a viscosity from 21 to 33 cPs at 25° C. in the case of the reaction with soy oil.

U.S. Patent Application Publication No. 2010/0010127 relates to bioplasticizers or primary oleochemical plasticizers and the improved process for obtaining them. It refers primarily to epoxidized oleochemical plasticizers produced from vegetable oils as a substitute for traditional petrochemical plasticizers.

U.S. Pat. No. 7,071,343 relates to epoxidized glyceride acetates made by a process which comprises reacting an epoxy fatty acid ester and triacetin.

WO2011/143028 relates to PVC resin-based compositions that include biochemical plasticizers as the primary plasticizers. The compositions include PVC resin, a compatibilizer, one or more biochemical plasticizers and, optionally, a thermoplastic elastomer impact modifier. The biochemical plasticizers are present in substantial quantities in the compositions and, in some embodiments, are the only plasticizers present in the compositions.

WO2013/055961 relates to plasticizer compositions comprising epoxidized fatty acid mono-esters and epoxy-esters.

Nevertheless, a continuing need exists for systems that provide improved stability and flexibility in PVC products. In particular, there is a need for PVC/stabilizer/plasticizer systems that minimize adverse environmental impact. Certain conventional phthalate plasticizers have a large carbon footprint, and present potential toxicological concerns to consumers. Additionally, conventional mixed metal stabilizers have Ba/Zn and Ca/Zn atomic ratios of between 1 to 3 and 0.33 to 1, respectively (Handbook of Polyvinyl chloride formulating; edited by Edward J. Wickson; John Wiley & Sons, 1993, p. 322-325). However, there is a growing sentiment to restrict or reduce certain mixed metal stabilizes designated as hazardous. Metals that are currently under the regulatory pressure include cadmium and lead, and to a certain extent barium and zinc. Reduction in the total metal content may also lead to improving certain performance characteristics of plasticized PVC, such as plasticizer permanence. Therefore, reducing the total metal content of both mixed metal stabilizers and flexible PVC compounds is critical for reducing amount of potentially hazardous chemicals in use as well as improving performance of the final articles.

It has unexpectedly been discovered that flexible PVC compounds having improved stability and reduced environmental impact can be produced using a low metals content mixed metal stabilizer system and at least one bio-based primary plasticizer comprising epoxidized fatty acid esters.

SUMMARY OF THE INVENTION

In one embodiment, the present invention relates to a flexible compound comprising PVC or its co-polymers; greater than 10 to 200 parts by weight of at least one bio-based primary plasticizer comprising epoxidized fatty acid esters, wherein the fatty acids are derived from natural oils and animal fats, based on 100 parts by weight of PVC or its co-polymers; and 0.001 to 10 parts by weight of a mixed metal stabilizer comprising a zinc compound and at least one metal compound, where the metal is selected from Li, Na, K, Mg, Ca, Sr, Ba, Cd, Al, La, Ce or rare earth metals, based on 100 parts by weight of PVC or its co-polymers, wherein an atomic ratio of metal/Zn for the mixed metal stabilizer is less than 1.0.

In another embodiment, the present invention relates to a process comprising mixing PVC or its copolymers, greater than 10 to 200 parts by weight of at least one bio-based plasticizer and 0.001 to 10 parts by weight of a mixed metal stabilizer, each based on 100 parts by weight of the PVC or its copolymers, wherein the at least one bio-based primary plasticizer comprises epoxidized fatty acid esters, the fatty acids are derived from natural oils and animal fats, and the mixed metal stabilizer comprises a zinc compound and at least one metal compound where the metal is selected from Li, Na, K, Mg, Ca, Sr, Ba, Cd, Al, La, Ce or rare earth metals, wherein an atomic ratio of metal/Zn for the mixed metal stabilizer is less than 1.0.

In still another embodiment, the present invention relates to a mixed metal stabilizer comprising a zinc compound and at least one metal compound, where the metal is selected from Li, Na, K, Mg, Sr, Ba, Cd, Al, La, Ce or rare earth metals, and wherein an atomic ratio of metal/Zn for the mixed metal stabilizer is less than 1.0.

In another embodiment, the present invention relates to a mixed metal stabilizer comprising a zinc compound and a calcium compound wherein the atomic ratio of calcium/Zn for the mixed metal stabilizer is less than 0.3.

In another embodiment, the present invention relates to a mixed metal stabilizer comprising a zinc compound and a barium compound wherein an atomic ratio of barium/Zn is less than 1.

DETAILED DESCRIPTION OF THE INVENTION

The flexible compound comprises polyvinyl chloride or its copolymers; greater than 10 to 200 parts by weight of at least one bio-based primary plasticizer comprising epoxidized fatty acid esters, wherein the fatty acids are derived from natural oils and animal fats, based on 100 parts by weight of PVC or its co-polymers; and 0.001 to 10 parts by weight of a mixed metal stabilizer. The mixed metal stabilizer comprises a zinc compound and at least one metal compound where the metal is selected from Li, Na, K, Mg, Ca, Sr, Ba, Cd, Al, La, Ce or rare earth metals, based on 100 parts by weight of PVC or its copolymers. An atomic ratio of metal/Zn for the mixed metal stabilizer is less than 1.0.

Polyvinyl Chloride

As employed herein, the term polyvinyl chloride ("PVC") is intended to include both homopolymers and copolymers of vinyl chloride, i.e., vinyl resins containing vinyl chloride units in their structure, e.g., copolymers of vinyl chloride and vinyl esters of aliphatic acids, in particular vinyl acetate; copolymers of vinyl chloride with esters of acrylic and methacrylic acid and with acrylonitrile; copolymers of vinyl chloride with diene compounds and unsaturated dicarboxylic acids or anhydrides thereof, such as copolymers of vinyl chloride with diethyl maleate, diethyl fumarate or maleic anhydride; post-chlorinated polymers and copolymers of vinyl chloride; copolymers of vinyl chloride and vinylidene chloride with unsaturated aldehydes, ketones and others, such as acrolein, crotonaldehyde, vinyl methyl ketone, vinyl methyl ether, vinyl isobutyl ether, and the like.

The PVC can be obtained via polymerization in bulk or in suspension, in emulsion, in micro suspension, or in suspended emulsion.

The term PVC as employed herein is also intended to include graft polymers of PVC with ethyl-vinyl acetate ("EVA"), acrylonitrile/butadiene-styrene ("ABS"), and meth-acrylate-butadiene ("MBS"). Preferred substrates are also mixtures of the above-mentioned homopolymers and copolymers, preferably vinyl chloride homopolymers, with other thermoplastic and/or elastomeric polymers, more preferably blends with ABS, MBS, acrylonitrile butadiene ("NBR"), styrene-acrylonitrile ("SAN"), EVA, chlorinated polyethylene ("CPE"), poly(methyl methylacrylate), ethylene propylene diene monomer ("EPDM"), and polylactones. Preferably, vinyl acetate, vinylidene dichloride, acrylonitrile, chlorofluoroethylene and/or the esters of acrylic, fumaric, maleic and/or itaconic acids are monomers that are copolymerizable with vinyl chloride.

Bio-Based Primary Plasticizer

The bio-based primary plasticizers suitable for plasticizing PVC compounds with the mixed metal stabilizers described below are epoxidized fatty acid esters comprising fatty acids derived from natural oils and animal fats. For the purposes of this specification, the expression "derived from" means "sourced from," so the oils and fats were used as feedstocks from which the fatty acids were obtained.

Suitable natural oils are vegetable oils and plant oils which may also contain triglyceride esters of fatty acids. The natural oils are selected from soybean oil, palm oil, olive oil, tall oil, castor oil, cotton seed oil, linseed oil, safflower oil, sunflower oil, canola oil, rapeseed oil, jatropha oil, algae oil, corn oil, tung oil, or mixtures thereof. Preferably, the natural oils are selected from soybean oil, linseed oil, tall oil or mixtures thereof.

For the purposes of this specification, the term "primary" in primary bio-based plasticizer means that while a compound may contain several plasticizers, the content of the bio-based plasticizer in the total amount of plasticizers is greater than 50% by weight, and it is added to the flexible PVC compound at greater than 10 parts by weight per 100 parts by weight of PVC or its copolymers.

Suitable animal fats are selected from beef/mutton, pork, dairy, poultry fat or mixtures thereof. Preferably, the animal fats are selected from suet, dripping, tallow, lard, bacon, fatback, butter, poultry fat, schmaltz, blubber or mixtures thereof.

The fatty acids derived from natural oils and animal fats are substantially fully esterified with monohydric alcohols or polyhydric alcohols. For the purposes of this specification, the term "substantially fully esterified" means that the amount of non-esterified (free) fatty acids is less than about 20% and more preferably less than 5% of the total amount of fatty acids present in the bio-based plasticizer.

The monohydric alcohols for esterifying fatty acids are selected from methanol, ethanol, n-propanol, isopropanol, butanol, pentanol, hexanol, cyclohexanol, octanol, n-octanol, iso-octanol, 2-ethylhexanol, nonanol, neodecanol, decanol, undecanol, dodecanol, tetradecanol, cetyl alcohol, stearyl alcohol, docosanol, epoxidized prop-2-en-1-ol, or mixtures thereof. Preferably, the monohydric alcohols have at least three carbon atoms. More preferably, the monohydric alcohols have at least six, or eight carbon atoms. Most preferably, the monohydric alcohols have at least eight carbon atoms.

The polyhydric alcohols are selected from glycols, glycerols, glycerol mono-acetate, pentaerythritol, or mixtures thereof.

When the fatty acids of the fatty acid esters contain double and/or triple bond unsaturation (examples of those fatty acids are oleic acid, linoleic acid or linolenic acid), these bonds are substantially fully epoxidized to the subject epoxidized fatty acid esters. For the purposes of this specification, the term "substantially fully epoxidized" means that the amount of non-epoxidized double and/or triple bonds is less than about 20% and more preferably less than 5% of their total amount.

The bio-based primary plasticizers suitable for plasticizing PVC compounds may also contain blends of at least two epoxidized fatty acid esters. Preferably, the blends include epoxidized 2-ethylhexyl tallate or epoxidized 2-ethylhexyl soyate and epoxidized soybean oil, although one skilled in the art can readily conceive of further exemplary combinations of epoxidized fatty acid esters. Preferably, the blends are stable, homogeneous, liquid blends.

The bio-based primary plasticizers are present in the compound in an amount of greater than 10 to 200 parts by weight, preferably in an amount from 15 to 75 parts by weight, more preferably 30 to 50 parts by weight based on 100 parts by weight of the PVC or its copolymers.

Any of the conventional blending processes, methods and techniques known to those skilled in the art, for example, admixing and mixing, can be used to prepare the liquid blends for the purpose of attaining homogeneity and/or stability. The epoxidized fatty acid esters can be combined in an admixture or blend, and kept, with or without agitation, for a predetermined amount of time at ambient temperature where the predetermined amount of time is in the range of from 1 to 24 hours, preferably from 1 to 10 hours, more preferably from two to four hours. Also preferred are times of 1, 2, 3, 4, 5, 6, 7, 8, 9, 10, 12, 14, 18, 22 hours.

The epoxidized fatty acid esters are combined at a temperature in the range of from 0-300° C. Preferred is a temperature range from 10-100° C. More preferred is a range from 20-80° C. Most preferred is a range from 30-60° C.

Co-Stabilizers

The stabilizer compositions can additionally contain co-stabilizers. Co-stabilizers which can be present in the compositions include polyols and other organic compounds, layered lattice compounds (hydrotalcite), phosphite compounds, and mixtures thereof. Such co-stabilizers are well known to those skilled in the art.

Polyols and Other Organic Components

Suitable polyols and other organic components are selected from sorbitol, triethanolamine, polyethylene glycols, β-diketones, such as dibenzoylmethane, uracil and its derivatives, or mixtures thereof. The polyols and other organic compounds can be used in an amount from 0.01 to 20 parts by weight, preferably from 0.1 to 10 parts by weight and more preferably from 0.1 to 5 parts by weight, based on 100 parts by weight of PVC or its copolymers.

Hydrotalcites

Examples of hydrotalcites that may be used as co-stabilizers are compounds known to those skilled in the art as shown, for example, in DE 384 35 81, EP 0 062 813 and WO 1993/20135.

Hydrotalcites that can be present in the compositions include those of the general formula: $M^{2+}_{1-x}M^{3+}_{x}(OH)_2 (An^{b-})_{x/b} dH_2O$, wherein $M^{2+}$ represents one or more metals from the group Mg, Ca, Sr, Zn and Sn, $M^{3+}$ represents Al or B, An is an anion having the valency n, b is a number from 1 to 2, $0<x<0.5$, and d is a number in the range from 0 to 300, preferably in the range from 0.5 to 30. Preferably, An is $OH^-$, $ClO_4^-$, $HCO_3^-$, $CH_3COO^-$, $C_6H_5COO^-$, $CO_3^{2-}$, $(CHOHCOO)_2^{2-}$, $(CH_2COO)_2^{2-}$, $CH_3CHOHCOO^-$, $HPO_3^-$ or $HPO_4^{2-}$.

Examples of hydrotalcites are $Al_2O_3 6\ MgO\ CO_2 12H_2O$ (i), $Mg_{4.5}\ Al_2(OH)_{13}CO_2\ 3.5H_2O$ (ii), $4MgOAl_2O_3CO_2 9H_2O$ (iii), $4MgOAl_2O_3CO_2 6H_2O$, $ZnO\ 3MgOAl_2O_3CO_2 8-9H_2O$ and $ZnO\ 3MgOAl_2O_3CO_2 5-6H_2O$. Preferred are types i, ii and iii.

The hydrotalcites can be present in the compound in an amount of from 0.1 to 20 parts by weight, preferably from 0.1 to 10 parts by weight and more preferably from 0.1 to 5 parts by weight per 100 parts by weight of PVC.

Phosphites

Suitable phosphites are selected from triphenyl phosphite, diphenyl isodecyl phosphite, ethylhexyl diphenyl phosphite, phenyl diisodecyl phosphite, trilauryl phosphite, triisononyl phosphite, triisodecyl phosphite, epoxy grade triphenyl phosphite, diphenyl phosphite, tris(nonylphenyl) phosphite, phosphites of polyols or mixtures thereof. The phosphites can be present in the compound in an amount of from 0.01 to 10 parts by weight, preferably from 0.05 to 5 parts by weight, and more preferably from 0.1 to 3 parts by weight per 100 parts by weight of the PVC or its copolymers.

Mixed Metal Stabilizer

The mixed metal stabilizer comprises a zinc compound and at least one metal compound where the metal is selected from Li, Na, K, Mg, Ca, Sr, Ba, Cd, Al, La, Ce or rare earth metals. Preferably, the mixed metal stabilizer comprises barium and zinc, magnesium and zinc, calcium and zinc, or calcium, magnesium and zinc.

Preferably, the zinc and metal compounds are independently selected from carboxylates, overbased carboxylates, glycerolates, oxides, hydroxides, phosphites, perchlorates, carbonates, basic carbonates or benzoates; where the carboxylates are independently selected from benzoates, oleates, stearates, palmitates, soyates, tallates, myristylates, hydroxystearates, dihydroxy-stearates, laurates, 2-ethylhexanoates and salts of shorter-chain alkanecarboxylic acids.

Preferably, the zinc and metal carboxylates are independently selected from the zinc, calcium, magnesium, or barium carboxylates of carboxylic acids having 7 to 18 carbon atoms. More preferably, the zinc and metal carboxylates are independently selected from the zinc, calcium, magnesium or barium salts of monovalent carboxylic acids such as octanoic, neodecanoic, 2-ethylhexanoic, decanoic, undecanoic, dodecanoic, tridecanoic, myristic, palmitic, isostearic, stearic, 12-hydroxystearic, lauric, behenic, and sorbic acid; and the calcium, magnesium and zinc salts of divalent carboxylic acids, such as oxalic, malonic, succinic, glutaric, adipic, fumaric, phthalic, isophthalic, terephthalic, hydroxyphthalic acid and citric acid. Overbased carboxylates, such as overbased zinc octoate and overbased calcium or barium soaps, are also preferred.

The zinc compound is typically present in the mixed metal stabilizer in an amount up to 25% based on the weight of the mixed metal stabilizer. Preferably, the zinc compound is present in an amount from 0.005% to 10%, based on the weight of the mixed metal stabilizer The metal compound is present in the mixed metal stabilizer in an amount up to 35% based on the weight of the mixed metal stabilizer. Preferably, the metal compound is present in an amount from 0.001% to 15% based on the weight of the mixed metal stabilizer.

The mixed metal stabilizer is present in the compound in an amount of from 0.001 to 10 parts by weight, preferably from 0.01 to 8 parts by weight, and more preferably from 0.05 to 5 parts by weight per 100 parts by weight of the PVC or its copolymers. Preferably, the atomic ratio of metal/Zn in the mixed metal stabilizer is less than 1.0. More preferably, the atomic ratio of metal/Zn in the mixed metal stabilizer is 0.01 to 0.75. Preferably, when the metal is calcium, the calcium/Zn atomic ratio is less than 0.3 in the mixed metal stabilizer. More preferably, when the metal is calcium, the calcium/Zn ratio is 0.1 to less than 0.3. Preferably, when the metal is barium, the barium/Zn atomic ratio is less than 0.66 in the mixed metal stabilizer. More preferably, when the metal is barium, the barium/Zn ratio is 0.1 to 0.6.

The mixed metal stabilizer can also contain liquid phosphite esters in a range of 0% to 75%, and 1,3-diketones in a range of 0% to 10%, both based on the total weight of the mixed metal stabilizer; and other minor components, such as benzoic acid, present in an amount from 0% to 10% based on the total weight of the mixed metal stabilizer; and a hydrocarbon solvent in amounts of 0% to 50% based on the weight of the mixed metal stabilizer.

Examples of liquid phosphite esters include thiophosphites, triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl) pentaerythritol diphosphite, bisisodecyloxy-pentaerythritol diphosphite, bis(2,4-di-tert-butyl-6-methylphenyl) pentaerythritol diphosphite, bis(2,4,6-tri-tert-butylphenyl) pentaerythritol diphosphite, tristearyl sorbitol triphosphite, bis(2,4-di-tert-butyl-6-methylphenyhl) methylphenyl)methyl phosphite, and bis(2,4-di-tert-butyl-6-methylphenyl)ethyl phosphite.

Preferably, the phosphites are aryl dialkyl and alkyl diaryl phosphites such as phenyl didodecyl, 2,4-di-tert-butylphenyl didodecyl phosphite, 2,6-di-tert-butylphenyl didodecyl phosphite and the dialkyl and diaryl pentaerythritol diphosphites, such as distearyl pentaerythritol diphosphite, and non-stoichiometric triaryl phosphites.

Examples of 1,3-diketones are acetylacetone, dibenzoylmethane, and stearoylbenzoylmethane.

Additives

Optionally, the PVC compounds may also include one or more additives to enhance or modify chemical or physical properties, such as heat stability, lubricity, color, and viscosity. Exemplary additives include, but are not limited to, lubricants, viscosity control agents, UV absorbers, antioxidants, antistatic agents, antimicrobials and antifungal compounds, fillers, fusion promoters, pigments, flame retardants, smoke suppressants, chemical foaming agents, reinforcing agents, metal release agents, dispersants among other compounds conventionally used in flexible PVC formulations. These additives may be added to the resin using techniques and equipment well known to those of ordinary skill in the art.

Lubricants

Suitable lubricants are selected from fatty acids, fatty alcohols, montan wax, fatty acid esters, polyethylene waxes, amide waxes, chloroparaffins, glycerol esters, alkaline earth metal soaps, fatty ketones, or mixtures thereof. Preferably, the lubricant is stearic acid. The lubricants can be present in amounts from 0.1 to 0.5 parts by weight, based on 100 parts by weight of PVC.

Fillers

Suitable fillers are selected from calcium carbonate, dolomite, wollastonite, magnesium oxide, magnesium hydroxide, silicates, china clay, talc, glass fibers, glass beads, wood flour, mica, metal oxides or metal hydroxides, carbon black, graphite, rock flour, heavy spar, glass fibres, talc, kaolin, chalk or mixtures thereof. The fillers can be present in amounts of 1 to 100 parts by weight, more preferably in amounts of 1 to 40 parts by weight and most preferably in amounts of 10 to 30 parts by weight, based on 100 parts by weight of PVC or its copolymers.

Pigments

Suitable pigments are selected from $TiO_2$, pigments based on zirconium oxide, $BaSO_4$, and zinc oxide (zinc white) or mixtures thereof. The pigments can be present in amounts of 1 to 20 parts by weight, based on 100 parts by weight of PVC or its copolymers.

Antioxidants

Suitable antioxidants are selected from alkylated monophenols such as 2,6-di-tert-butyl-4-methylphenol, alkylthiomethylphenols, 2,4-dioctylthiomethyl-6-tert-butylphenol; alkylated hydroquinones such as 2,6-di-tert-butyl-4-methoxyphenol; hydroxylated thiodiphenyl ethers such as 2,2'-thiobis(6-tert-butyl-4-methylphenol); alkylidenebisphenols such as 2,2'-methylene-bis(6-tert-butyl-4-methylphenol); benzyl compounds such as 3,5,3',5'-tetratert-butyl-4,4'-dihydroxydibenzyl ether; hydroxybenzylated malonates, such as dioctadecyl 2,2-bis(3,5-di-tert-butyl-2-hydroxybenzyl)malonate; hydroxybenzyl aromatics such as 1,3,5-tris(3,5-di-tert-butyl-4-hydroxybenzyl)-2,4,6-trimethylbenzene; triazine compounds such as 2,4-bisoctylmercapto-6-(3,5-di-tert-butyl-4-hydroxyanilino)-1,3,5-triazine; phosphonates and phosphonites such as dimethyl 2,5-di-tert-butyl-4-hydroxybenzylphosphonate; acylaminophenols such as 4-hydroxylauranilide; esters of β-(3,5-ditert-butyl-4-hydroxyphenyl)propionic acid such as pentaerythritol tetrakis(3-(3,5-di-tert-butyl-4-hydroxyphenyl)propionate), octadecyl-3-(3,5-di-tert-butyl-4-hydroxyphenyl)propionate, β-(5-tert-butyl-4- hydroxy-3-methylphenyl)propionic acid, and β-(3,5-dicyclohexyl-4-hydroxyphenyl)propionic acid; esters of 3,5-ditert-butyl-4-hydroxyphenylacetic acid with mono- or polyhydric alcohols; amides of β-(3,5-ditert-butyl-4-hydroxyphenyl)propionic acid such as N,N'-bis(3,5-ditert-butyl-4-hydroxyphenyl-propionyl)hexamethylenediamine; vitamin E (tocopherol) and derivatives or mixtures thereof.

The antioxidants can be present in amounts of 0.01 to 10 parts by weight, preferably, 0.1 to 5 parts by weight and more preferably from 0.1 to 3 parts by weight, based on 100 parts by weight of PVC.

UV Absorbers and Light Stabilizers

The UV absorbers and light stabilizers may by selected from 2-(2'-hydroxyphenyl)benzotriazoles such as 2-(2'-hydroxy-5'-methylphenyl)-benzotriazole, 2-hydroxybenzophenones; esters of unsubstituted or substituted benzoic acids such as 4-tert-butylphenyl salicylate and phenyl salicylate; acrylates; nickel compounds; oxalamides such as 4,4'-dioctyloxyoxanilide, and 2,2'-dioctyloxy-5,5'-ditert-butyloxanilide; 2-(2-hydroxyphenyl)-1,3,5-triazines such as 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine; sterically hindered amines such as bis(2,2,6,6-tetramethylpiperidin-4-yl)sebacate, bis(2,2,6,6-tetramethylpiperidin-4-yl) succinate or mixtures thereof.

Blending

The components of the flexible compound can be blended by mixing in a mixer or by dry-blending, or by compounding in well-known processes such as extrusion, calendaring, molding and combinations thereof. Compounding of the PVC, plasticizer and mixed metal stabilizer can also include first blending the components as described above, followed by compounding.

EXAMPLES

The following Examples further detail and explain preparation of the inventive flexible compounds having low metals content, and demonstrate their enhanced stability. These examples merely illustrate the invention. Those skilled in the art will recognize many variations that are within the spirit of the invention and scope of the claims.

Control STAB-1

Control STAB-1 is a barium/zinc stabilizer commercially available as Mark 4852 from Galata Chemicals, LLC. The metals content of STAB-1 is shown in Table 2. CONTROL PLAS-1.

Control PLAS-1 is a mixture of 37 parts per hundred by weight of di-isononyl phthalate ("DINP") and 3 parts per hundred by weight of epoxidized soybean oil ("ESBO"). Use of this compound in the examples demonstrates the performance of a phthalate-plasticized PVC compound in which ESBO is used as a secondary plasticizer.

STAB-2

STAB-2 is a modified mixed metal barium/zinc stabilizer. The metals content of STAB-2 is shown in Table 2.

PLAS-2

PLAS-2 was prepared by blending 50 g of epoxidized 2-ethylhexyl soyate and 50 g of epoxidized soybean oil, and then mixing the blend for one hour at ambient temperature to attain a stable, homogeneous liquid blend.

PVC-1

PVC-1 is a polyvinyl chloride homopolymer commercially available from OxyVinyls, LP as OxyVinyls® 450F.

Static Heat Stability

Static heat stability of plasticized PVC compositions containing various stabilizers was determined by milling the compositions into sheets. The sheets were prepared under standardized conditions using a two-roll mill (Dr. Collin GmbH, Ebersberg, Germany). The gap between the rolls was about 0.5 mm, and the temperature of the rolls was 165° C. The time for preparation and homogenization was 5 minutes. Sheet thickness was 0.5 mm. The PVC sheet was continuously moved from the two sides to the center, and the enlargement thus obtained was distributed over the gap with a wooden spatula over the roll with intensive homogenization of all components.

15 mm wide strips were cut from each milled sheet such that eight rectangular samples (15 mm×10 mm) from each sheet were produced. The samples were placed in an oven (Blue M Company, New Columbia, Pa., USA) operating at 190° C. for thermal aging. The samples were removed from the oven at the rate of one sample every ten minutes.

Assessment of the thermal stability of the flexible PVC formulations was carried out by determining the discoloration due to the polymer degradation. The Yellowness Index (ASTM D 1925-70 Yellowness Index of plastics) was measured and recorded for each sample using the microprocessor Hunterlab Labscan Spectro Colorimeter, Type 5100.

Milled sheets were prepared in accordance with formulations of Table 1, where "phr", stands for parts of additives by weight per hundred parts of PVC resin by weight. Stabilizer compositions and their loadings were varied to maximize heat stabilizing performance of the stabilizers in the PVC compounds, as measured via Static Heat Stability in the Yellowness Index.

Example

Testing Ba/Zn Stabilizers

TABLE 1

Tested PVC compounds (all components are shown in phr)

| Components | Example 1 | Example 2 | Example 3 | Example 4 | Example 5 | Example 6 | Example 7 | Example 8 |
|---|---|---|---|---|---|---|---|---|
| PVC-1 | 100.0 | 100.0 | 100.0 | 100.0 | 100.0 | 100.0 | 100.0 | 100.0 |
| Lubricant (Stearic Acid) | 0.2 | 0.2 | 0.2 | 0.2 | 0.2 | 0.2 | 0.2 | 0.2 |
| Control PLAS-1 | 40.0 | 40.0 | | | 40.0 | 40.0 | | |
| PLAS-2 | | | 40.0 | 40.0 | | | 40.0 | 40.0 |
| Control STAB-1 | 2.0 | 1.2 | 2.0 | 1.2 | | | | |
| STAB-2 | | | | | 2.0 | 1.2 | 2.0 | 1.2 |

The calculated metal content of barium and zinc, as well as the total metal content and atomic ratios between barium and zinc in the tested stabilizers, are shown in Table 2.

TABLE 2

Metal content of tested stabilizers

| Stabilizers | Barium, % | Zinc, % | Barium/Zinc atomic ratio | Total Metal content, % | Metal content Reduction, % |
|---|---|---|---|---|---|
| Control STAB-1 | 12.08 | 1.47 | 3.9 | 13.55 | N/A |
| STAB-2 | 1.67 | 2.26 | 0.4 | 3.93 | 71 |

The calculated metal content of barium and zinc, as well as the total metal content in the example compounds, are shown in Table 3.

TABLE 3

Metal content (contributed by the stabilizers) of the Tested PVC Compounds

| Metal content | Example 1 | Example 2 | Example 3 | Example 4 | Example 5 | Example 6 | Example 7 | Example 8 |
|---|---|---|---|---|---|---|---|---|
| Barium, % | 0.170 | 0.103 | 0.170 | 0.103 | 0.023 | 0.014 | 0.023 | 0.014 |
| Zinc, % | 0.021 | 0.012 | 0.021 | 0.012 | 0.032 | 0.019 | 0.032 | 0.019 |
| Total, % | 0.191 | 0.115 | 0.191 | 0.115 | 0.055 | 0.033 | 0.055 | 0.033 |
| Metal content reduction, % | N/A | | | | | | | 83 |

The results of the thermal stability assessment of the PVC compounds plasticized with bio-based epoxy-type plasticizers and stabilized with the barium/zinc stabilizers at low metals levels are summarized in Table 4. A lower number represents yellow color of lower intensity, and therefore, better heat stabilizing performance of a stabilizer.

TABLE 4

Static Heat Stability of the tested PVC compounds (expressed in Yellowness Index)

| Time, min. | Example 1 | Example 2 | Example 3 | Example 4 | Example 5 | Example 6 | Example 7 | Example 8 |
|---|---|---|---|---|---|---|---|---|
| 10 | 9.53 | 10.59 | 12.12 | 12.97 | 12.06 | 11.80 | 11.55 | 11.43 |
| 20 | 17.82 | 33.78 | 14.89 | 29.20 | Blackened | Blackened | 18.07 | 17.63 |
| 30 | 63.91 | 75.81 | 36.60 | 64.57 | | | 29.35 | 33.30 |
| 40 | 89.40 | 99.90 | 77.37 | 91.60 | | | 42.42 | 40.18 |
| 50 | 98.48 | 100.58 | 102.81 | 108.24 | | | 43.66 | 49.31 |
| 60 | 102.47 | 108.54 | 102.73 | 113.30 | | | 56.60 | 57.44 |
| 70 | Blackened | Blackened | Blackened | Blackened | | | Blackened | Blackened |

In Table 4, the results of Examples 1 and 2 demonstrate reduced heat stability corresponding to a reduction in the Control STAB-1 loading from 2.0 to 1.2 phr. Yellowness Index numbers were higher after 10 min of exposure to heat while being used in combination with Control PLAS-1. Use of Control STAB-1 at a loading of 2.0 phr in combination with PLAS-2 (Example 3) resulted in an overall comparable heat stabilizing performance relative to Example 1. The yellowness index numbers were only slightly higher over the first 10 min and 50 min, and were somewhat superior from 20 to 40 min. Use of Control STAB-1 at a reduced loading of 1.2 phr in combination with PLAS-2 (Example 4) resulted in inferior heat stabilizing performance relative to Example 1. Yellowness Index numbers were higher over the full time period of exposure to heat.

Use of STAB-2 at a loading of 2.0 phr in combination with Control PLAS-1 (Example 5) resulted in significantly reduced heat stability relative to Example 1 because of the lower barium content. The sample blackened after 10 min of exposure to heat. According to Table 2, the barium content of STAB-2 was substantially lower than that of Control STAB-1 (1.67 and 12.08%, respectively). Since their zinc content was similar (2.26 and 1.47%, respectively), the barium/zinc atomic ratio was also reduced from 3.9 to 0.4, resulting in a 71% reduction in total metal content between the Control STAB-1 and STAB-2, the stabilizer of the present invention.

Use of STAB-2 at the reduced loading of 1.2 phr in combination with Control PLAS-1 (Example 6) also resulted in significantly reduced the long-term heat stability. The sample blackened after 10 min of exposure to heat.

Use of STAB-2 at a loading of 2.0 in combination with PLAS-2 (Example 7) unexpectedly resulted in comparable initial and significantly improved long-term heat stability relative to Example 1. The yellowness index numbers were similar over the first 20 min of exposure to heat and much lower at 30-60 min. Use of STAB-2 at a reduced loading of 1.2 phr in combination with PLAS-2 (Example 8) also resulted in comparable initial and significantly improved long-term heat stability relative to Example 1. The yellowness index numbers were similar over the first 20 min of exposure to heat and much lower at 30-60 min. This performance was achieved despite reduction in the stabilizer loading and barium content Thus, the heat stabilizing performance of STAB-2 at 1.2 phr in Example 8 was comparable to the 2.0 phr loading of Example 7, where in both cases PLAS-2 was used. Moreover, taking into consideration both the stabilizer compositions and their respective loadings, according to Table 3, the total metal content of the PVC compound of Example 8 was reduced by 83% compared with Example 1.

Example

Testing a Ca/Zn Stabilizers

Control STAB-3

Control STAB-3 is a standard calcium/zinc stabilizer. The metals content of Control STAB-3 is shown in Table 6.

STAB-4

STAB-4 is a modified calcium/zinc stabilizer. The metals content of STAB-4 is shown in Table 6.

Milled sheets were prepared in accordance with formulations of Table 5.

TABLE 5

Tested PVC compounds (all components are shown in phr)

| Components | Example 9 | Example 10 |
|---|---|---|
| PVC-1 | 100.0 | 100.0 |
| Lubricant (Stearic Acid) | 0.25 | 0.25 |
| Control PLAS-1 | 40.0 | |
| PLAS-2 | | 40.0 |
| Control STAB-3 | 1.0 | |
| STAB-4 | | 0.6 |

The calculated metal content of calcium and zinc, as well as the atomic ratios between calcium and zinc in the tested stabilizers, are shown in Table 6.

TABLE 6

Metal content of tested stabilizers

| Stabilizers | Calcium, % | Zinc, % | Calcium/Zinc atomic ratio |
|---|---|---|---|
| Control STAB-3 | 1.96 | 8.28 | 0.39 |
| STAB-4 | 1.19 | 9.55 | 0.20 |

The calculated metal content of calcium and zinc, as well as the total metal content in the example compounds, are shown in Table 7.

TABLE 7

Metal content (contributed by the calcium/zinc stabilizers) of the Tested PVC Compounds

| Metal content | Example 9 | Example 10 |
|---|---|---|
| Calcium, % | 0.014 | 0.005 |
| Zinc, % | 0.059 | 0.041 |
| Total, % | 0.072 | 0.046 |
| Metal content reduction, % | N/A | 36 |

The results of the thermal stability assessment of the PVC compounds plasticized with bio-based epoxy-type plasticizers and stabilized with the calcium/zinc stabilizers at low metals levels are summarized in Table 8.

TABLE 8

Static Heat Stability of the tested PVC compounds (expressed in Yellowness Index)

| Time, min. | Example 9 | Example 10 |
|---|---|---|
| 10 | 8.40 | 8.97 |
| 20 | 9.16 | 13.71 |
| 30 | 14.99 | 19.11 |
| 40 | Blackened | 24.16 |
| 50 | | 29.61 |
| 60 | | 38.67 |
| 70 | | 58.09 |
| 80 | | 71.56 |
| 90 | | Blackened |

In Table 8, the results of Examples 9 and 10 demonstrate improved long-term heat stability of a compound plasticized with PLAS-2 and prepared with the use of STAB-4 even at the reduced (0.6 phr) loading compared with that of the PLAS-1/Control STAB-3 (1.0 phr) combination. According to Table 6, the calcium content of STAB-4 was lower than that of Control STAB-3 and the calcium/zinc atomic ratio was reduced from 0.39 to 0.20, resulting in a 36% reduction in the total metal content of the PVC compound of Example 10 compared with Example 9 (Table 7).

We claim:

1. A flexible compound comprising:
   a. homopolymers or copolymers of vinyl chloride;
   b. greater than 10 to 200 parts by weight of at least one bio-based primary plasticizer comprising epoxidized fatty acid esters, wherein the fatty acids are derived from natural oils and animal fats, based on 100 parts by weight of the homopolymers or co-polymers of vinyl chloride; and
   c. 0.001 to 10 parts by weight of a mixed metal stabilizer comprising a zinc compound and at least one metal compound where the metal is selected from Li, Na, K, Mg, Ca, Sr, Ba, Cd, Al, La, Ce or rare earth metals, based on 100 parts by weight of the homopolymers or co-polymers of vinyl chloride,
   wherein an atomic ratio of metal/Zn for the mixed metal stabilizer is less than 1.0.

2. The flexible compound of claim 1, wherein the natural oils are selected from vegetable oils or plant oils.

3. The flexible compound of claim 2, wherein the natural oils are selected from soybean oil, palm oil, olive oil, tall oil, castor oil, cotton seed oil, linseed oil, safflower oil, sunflower oil, canola oil, rapeseed oil, Jatropha oil, algae oil, corn oil, tung oil, or mixtures thereof.

4. The flexible compound of claim 3, wherein the natural oils are selected from soybean oil, linseed oil, tall oil or mixtures thereof.

5. The flexible compound of claim 1 wherein the animal fats are selected from beef, mutton, pork, dairy, poultry fat or mixtures thereof.

6. The flexible compound of claim 5 wherein the animal fats are selected from suet, dripping, tallow, lard, bacon, fatback, butter, poultry fat, schmaltz, blubber or mixtures thereof.

7. The flexible compound of claim 1 wherein the fatty acids derived from natural oils and animal fats are substantially fully esterified with monohydric alcohols or polyhydric alcohols.

8. The flexible compound of claim 1 wherein the at least one bio-based primary plasticizer is present in an amount from 15 to 75 parts by weight based on 100 parts by weight of the homopolymers or copolymers of vinyl chloride.

9. The flexible compound of claim 8, wherein the at least one bio-based primary plasticizer is present in an amount from 30 to 50 parts by weight based on 100 parts by weight of the homopolymers or copolymers of vinyl chloride.

10. The flexible compound of claim 1, wherein the mixed metal stabilizer comprises barium and zinc, magnesium and zinc, calcium and zinc, or calcium, magnesium and zinc.

11. The flexible compound of claim 1, wherein the zinc and metal compounds are independently selected from carboxylates, overbased carboxylates, glycerolates, hydroxides, phosphites, or benzoates, the carboxylates being independently selected from oleates, stearates, palmitates, soyates, tallates, myristylates, hydroxystearates, dihydroxy-stearates, laurates, 2-ethylhexanoates and salts of shorter-chain alkanecarboxylic acids.

12. The flexible compound of claim 11 wherein the zinc and metal carboxylates are selected from carboxylates of carboxylic acids having 7 to 18 carbon atoms.

13. The flexible compound of claim 1, wherein the mixed metal stabilizer is present in an amount from 0.01 to 8 parts by weight per 100 parts by weight of the homopolymers or copolymers of vinyl chloride.

14. The flexible compound of claim 13, wherein the mixed metal stabilizer is present in an amount from 0.05 to 5.0 parts by weight per 100 parts by weight of the homopolymers or copolymers of vinyl chloride.

15. The flexible compound of claim 1, wherein when the metal is calcium, a calcium/Zn atomic ratio is less than 0.3 in the mixed metal stabilizer.

16. The flexible compound of claim 1, wherein the mixed metal stabilizer further comprises a co-stabilizer selected from polyols, hydrotalcites, phosphite compounds, and mixtures thereof.

17. A process comprising:
   mixing homopolymers or copolymers of vinyl chloride, greater than 10 to 200 parts by weight of at least one bio-based plasticizer and 0.001 to 10 parts by weight of a mixed metal stabilizer, each based on 100 parts by weight of the homopolymers or copolymers of vinyl chloride, wherein
   the at least one bio-based primary plasticizer comprises epoxidized fatty acid esters wherein the fatty acids are derived from natural oils and animal fats, and
   the mixed metal stabilizer comprises a zinc compound and at least one metal compound where the metal is selected from Li, Na, K, Mg, Ca, Sr, Ba, Cd, Al, La, Ce or rare earth metals, and an atomic ratio of metal/Zn for the mixed metal stabilizer is less than 1.0.

18. The process of claim 17, wherein the natural oils are selected from vegetable oils or plant oils.

19. The process of claim 18, wherein the natural oils are selected from soybean oil, palm oil, olive oil, tall oil, castor oil, cotton seed oil, linseed oil, safflower oil, sunflower oil, canola oil, rapeseed oil, jatropha oil, algae oil, corn oil, tung oil, or mixtures thereof.

20. The process of claim 19, wherein the natural oils are selected from soybean oil, linseed oil, tall oil or mixtures thereof.

21. The process of claim 17 wherein the animal fats are selected from beef, mutton, pork, dairy, poultry fat or mixtures thereof.

22. The process of claim 21 wherein the animal fats are selected from suet, dripping, tallow, lard, bacon, fatback, butter, poultry fat, schmaltz, blubber or mixtures thereof.

23. The process of claim 17 wherein the fatty acids derived from natural oils and animal fats are substantially fully esterified with monohydric alcohols or polyhydric alcohols.

24. The process of claim 17 wherein the at least one bio-based primary plasticizer is present in an amount from 15 to 75 parts by weight based on 100 parts by weight of the homopolymers or copolymers of vinyl chloride.

25. The process of claim 24, wherein the at least one bio-based primary plasticizer is present in an amount from 30 to 50 parts by weight based on 100 parts by weight of the homopolymers or copolymers of vinyl chloride.

26. The process of claim 17, wherein the mixed metal stabilizer comprises barium and zinc, magnesium and zinc, calcium and zinc, or calcium, magnesium and zinc.

27. The process of claim 17, wherein the zinc and metal compounds are independently selected from carboxylates, overbased carboxylates, glycerolates, hydroxides, phosphites, or benzoates, the carboxylates being independently selected from oleates, stearates, palmitates, soyates, tallates, myristylates, hydroxystearates, dihydroxy-stearates, laurates, 2-ethylhexanoates and salts of shorter-chain alkanecarhoxylic acids.

28. The process of claim 27 wherein the zinc and metal carboxylates are selected from carboxylates of carboxylic acids having 7 to 18 carbon atoms.

29. The process of claim 17, wherein the mixed metal stabilizer is present in an amount from 0.01 to 8 parts by weight per 100 parts by weight of the homopolymers or copolymers of vinyl chloride.

30. The process of claim 29, wherein the mixed metal stabilizer is present in an amount from 0.05 to 5.0 parts by weight per 100 parts by weight of the homopolymers or copolymers of vinyl chloride.

31. The process of claim 17, wherein when the metal is calcium, a calcium/Zn atomic ratio is less than 0.3 in the mixed metal stabilizer.

32. The process of claim 17 wherein the mixed metal stabilizer further comprises a co-stabilizer selected from polyols, hydrotalcites, phosphite compounds, and mixtures thereof.

33. A mixed metal stabilizer comprising a zinc compound and at least one metal compound, where the metal is selected from Li, Na, K, Mg, Sr, Ba, Cd, Al, La, Ce or rare earth metals, wherein an atomic ratio of metal/Zn for the mixed metal stabilizer is less than 1.0.

34. The mixed metal stabilizer of claim 33 wherein the atomic ratio of metal/Zn for the mixed metal stabilizer is 0.01 to 0.75.

35. A mixed metal stabilizer comprising a zinc compound and a calcium compound wherein the atomic ratio of calcium/Zn for the mixed metal stabilizer is less than 0.3.

36. The mixed metal stabilizer of claim 35 wherein the atomic ratio of calcium/Zn for the mixed metal stabilizer is 0.1 to less than 0.3.

37. A mixed metal stabilizer comprising a zinc compound and a barium compound wherein an atomic ratio of barium/Zn is less than 1.

38. The mixed metal stabilizer of claim 37 wherein the atomic ratio of barium/Zn for the mixed metal stabilizer is less than 0.66.

39. The flexible compound of claim 38 wherein the atomic ratio of barium/Zn for the mixed metal stabilizer is 0.1 to 0.6.

40. A flexible compound comprising:
   a. homopolymers or copolymers of vinyl chloride;
   b. greater than 10 to 200 parts by weight of a bio-based primary plasticizer comprising a blend of epoxidized soybean oil and epoxidized 2-ethylhexyl tallate or epoxidized 2-ethylhexyl soyate, based on 100 parts by weight of the homopolymers or co-polymers of vinyl chloride; and
   c. 0.001 to 10 parts by weight of a mixed metal stabilizer comprising a zinc compound and at least one metal compound where the metal is selected from Ca or Ba, based on 100 parts by weight of the homopolymers or co-polymers of vinyl chloride,
wherein an atomic ratio of metal/Zn for the mixed metal stabilizer is less than 1.0.

41. The flexible compound of claim 40 wherein the bio-based primary plasticizer is a blend of epoxidized soybean oil and epoxidized 2-ethylhexyl tallate.

42. The flexible compound of claim 40 wherein the bio-based primary plasticizer is a blend of epoxidized soybean oil and epoxidized 2-ethylhexyl soyate.

* * * * *